United States Patent Office 3,420,829
Patented Jan. 7, 1969

3,420,829
3,4 - DIHYDRO - 4 - OXO - 1,2,3 - BENZOTRIAZINE-3-YL-ETHYL PHOSPHORIC AND PHOSPHONIC ACID ESTERS
Walter Lorenz, Wuppertal-Vohwinkel, Germany, assignor to Farbenfabriken Bayer Aktiengesellschaft, Leverkusen, Germany, a corporation of Germany
No Drawing. Filed May 12, 1966, Ser. No. 549,470
Claims priority, application Germany, May 18, 1965, F 46,077
U.S. Cl. 260—248                 7 Claims
Int. Cl. C07d 55/08

ABSTRACT OF THE DISCLOSURE

Thiol- and thionothiol-phosphoric and -phosphonic acid esters having the formula

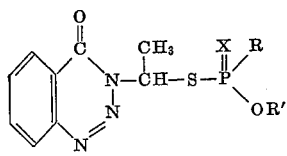

in which R is lower alkyl, lower alkoxy or phenyl, R' is lower alkyl, and X is oxygen or sulfur, which possess pesticidal properties and which may be utilized in compositions with dispersible carrier vehicles, and which may be prepared by conventional methods.

---

The present invention relates to particular new phosphorus-containing esters, their pesticidal compositions with dispersible carrier vehicles, and methods for the preparation and use thereof.

It is already known from German Patent No. 927,270 that N-halomethyl benzazimides can be reacted with salts of 0,0-dialkyl-thiol- and -thionothiol-phosphoric acids to form the corresponding thio- or dithio-phosphoric acid esters of N-methyl benzazimide. These latter compounds are characterized by a high insecticidal activity.

Furthermore, published German patent specification No. 1,083,827 describes thiol- or thionothiol-phosphonic acid esters of N-methyl-benzazimide which also have a good insecticidal and acaricidal activity.

It is an object of the present invention to provide particular new phosphorous-containing esters, such as thiol- and thionothiol-phosphoric and -phosphonic acid esters, which possess valuable pesticidal, and especially insecticidal and acaricidal, activity; to provide active compositions in the form of mixtures of such compounds with solid and liquid dispersible carrier vehicles; to provide a process for producing such compounds; and to provide methods of using such compounds in a new way, especially for combating pests, such as insects and acarids, and the like.

Other and further objects of the present invention will become apparent from a study of the within specification and accompanying examples.

It has now been found, in accordance with the present invention, that thiol- and thionothiol-phosphoric and -phosphonic acid esters having the formula:

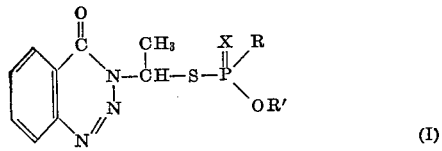

in which R is a member selected from the group consisting of lower alkyl, lower alkoxy, and phenyl, R' is lower alkyl, and X is a member selected from the group consisting of oxygen and sulfur, exhibit strong pesticidal, and especially insecticidal and acaricidal, properties.

It has been further found in accordance with the present invention that the particular new phosphorus- containing compounds of Formula I above may be produced by a process which comprises reacting a salt of the general formula:

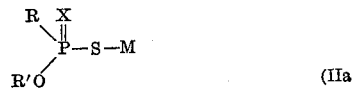

in which R,R' and X are the same as defined above and M is a monovalent metal equivalent, especially an alkali metal equivalent such as sodium, potassium, lithium, etc., or an ammonium group, with an N-haloethyl-(2)-benzazimide of the general formula:

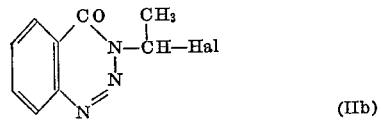

in which Hal is a halogen atom including chlorine, bromine, fluorine, and iodine, and especially chlorine.

Advantageously, the particular new compounds according to the present invention possess outstanding insecticidal and acaricidal properties. In comparison with the compounds of analogous structure which are known from German Patent No. 927,270 and published German patent specification 1,083,827 and which have been proposed heretofore for the same purpose, the instant compounds, some of which have only a very low toxicity towards warm-blooded animals and which have only a low phytotoxicity, surprisingly, possess a markedly superior activity against spider mites which are generally resistant to phosphoric acid esters and, above all, also posses a marked activity against caterpillars, as well as eto- and endo parasites affecting large animals, for example, against ticks, blowfles and scab mites. These favorable pesticidal properties of the instant compounds are completely absent from the above-mentioned known compounds of analogous structure. The particular new compounds according to the present invention thus constitute a genuine enrichment of the art.

The course of the versatile production process according to the present invention is illustrated in greater detail by the following equation:

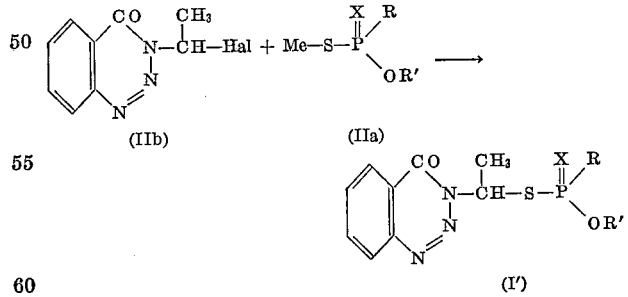

In the above equation, R, R', X, Hal and Me are the same as defined above.

The N-haloethyl-(2)-benzazimides required as starting materials for carrying out the production process according to the present invention, particularly N-chloroethyl-(2)-benzazimide, have not been described in the literature but they can be prepared, in a simple manner, by reacting benzazimide with acetaldehyde and a halogenating agent, for example, thionyl chloride or thionyl bromide. The reaction is expediently carried out in an inert organic solvent, preferably in a low-boiling aliphatic halogenated hydrocarbon, such as methylene chloride, chloroform or tetrachloroethylene, as well as in the presence of catalytic amounts of dimethyl formamide and at slightly to moderately elevated temperatures (e.g., about 30 to 50° C.).

The production process itself, according to the present invention, is also preferably carried out in the presence of inert organic solvents or diluents. Lower aliphatic alcohols, ketones and nitriles, such as methanol, ethanol, n-propanol, isopropanol, butanol, acetone, methyl ethyl ketone, methyl isopropyl ketone, methyl isobutyl ketone, acetonitrile and propionitrile, have chiefly proved suitable for this purpose.

It has also proved advantageous to carry out the reaction according to the present invention at a slightly to moderately elevated temperature. This may be varied within a fairly wide range, however, as the artisan will appreciate. In general, the operation is carried out between about 30 and 80° C., and preferably 50 to 70° C. After the starting components have been mixed together, the reaction mixture is further heated for some time (e.g., about 1–3 hours), optionally with stirring, in order to achieve better yields and purer products.

Approximately equimolar amounts of the reaction components can be used suitably for carrying out the production process according to the present invention. However, it is sometimes expedient to use the phosphorus-containing salt in a certain excess (e.g., about 10%).

The particular new compounds of the present invention are usually obtained in the form of oils but they frequently solidify in crystalline form when allowed to stand for a prolonged period of time. The instant compounds can easily be further purified by recrystallization from the customary solvents or solvent mixtures and are then mostly colorless and have a sharp melting point. However, some of the particular new compounds according to the present invention can only be obtained in the form of yellow to orange colored oils which do not crystallize and cannot be distilled without decomposition, even under strongly reduced pressure.

As has already been mentioned above, the particular new compounds of the present invention are characterized by an outstanding insecticidal and acaricidal activity while having, in some cases, only a relatively low toxicity towards warm-blooded animals and a low phytotoxicity. The instant compounds are, therefore, usable with very good results as pest control agents, i.e., in plant protection and in the fields of hygiene and veterinary medicine for combating pests, e.g., sucking and biting insects, Diptera and mites of various kinds.

The marked pesticidal effect of the particular new compounds according to the present invention on spider mites which are resistant to phosphoric acid esters, as well as their systemic and ovicidal activity, is to be specially emphasized.

Typical sucking insects contemplated herein essentially include aphids, such as the peach aphid (*Myzus persicae*) and the black bean aphid (*Doralis fabae*), and the like; coccids, such as *Aspidiotus hederae, Lecanium hesperidum, Pseudococcus maritimus,* and the like; Thysanoptera, such as *Hercinothrips femoralis,* and the like; and bugs, such as the beet bug (*Piesma quadrata*) and the bed bug (*Cimex lectularius*), and the like.

Among the biting insects contemplated herein are essentially butterfly larvae, such as *Plutella maculipennis, Lymantria dispar,* and the like; beetles, such as grain weevils (*Sitophilus granarius*), the Colorado beetle (*Leptinotarsa decemlineata*), and the like; but also species living in the soil, such as wire worms (Agriotes sp.) and cockhafer larvae (*Melolontha melolontha*), and the like; cockroaches, such as the German cockroach (*Blatella germanica*), and the like; Orthoptera, such as the cricket (*Gryllus domesticus*), and the like; termites, such as Reticulitermes, and the like; and Hymenoptera, such as ants, and the like.

The Diptera contemplated herein essentially comprise the flies, such as the fruit fly (*Drosophila melanogaster*), the Mediterranean fruit fly (*Ceratitis capitata*) and the house fly (*Musca domestica*), and gnats, such as the mosquito (*Aedes aegypti*), bluebottle flies, such as the gold fly (*Lucilia sericata*), and blowflies (*Chrysomyia chloropyga*), and the like.

Especially important mites contemplated herein are the spider mites (Tetranychidae), such as the common spider mite (*Tetranychus urticae*) and the fruit tree spider mite (*Paratetranychus pilosus*), and the like; gall mites, such as the red currant gall mite (*Eriophyes ribis*), and the like; and Tarsonemides, such as *Tarsonemus pallidus,* and the like; and also ticks, such as *Boöphilus microplus* and scab mites, and the like.

Thus, the new compounds of the instant invention can be used as pesticides either alone or in admixture with solid or liquid carriers or diluent.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including smulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight of the mixture, whereas carrier composition mixtures suitable for direct application or field application generally contemplate those in which the active compound is present in an amount substantially between about 0.00001 and 20%, preferably 0.0001 and 5%, by weight of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.00001 and 95% by weight of the mixture.

Furthermore, the present invention contemplates methods of combating pests, especially insects and acarids, which comprise applying to at least one of (a) such pests and (b) their habitat, a pesticidally, especially insecticidally and/or acaricidally, effective amount of the particular active compound of the invention alone or together with a carrier vehicle, as noted above. The instant formulations or compositions are applied in the usual manner, for example, by spraying, atomizing, scattering, dusting, watering, sprinkling, vaporizing, and fumigating, and the like. It will be realized in accordance with the present invention that the instant compounds may be used effectively not only in plant protection, but also in hygiene control, especially against insects and acarids.

The outstanding biological activity of the particular new compounds of the present invention and their technical superiority over known compounds of analogous structure, which have been proposed for the same purpose, can be seen from the following examples:

Example 1.—Doralis test (contact action)

Solvent: 3 parts by weight acetone. Emulsifier: 1 part by weight alkylaryl polyglycol ether.

To produce a suitable preparation of the particular active compound, 1 part by weight of such active compound is mixed with the stated amount of solvent containing the stated amount of emulsifier and the concentrate thereby formed is diluted with water to the desired final concentration.

Bean plants (*Vicia faba*), which have been heavily infested with black bean aphids (*Doralis fabae*), are sprayed with the stated preparation of the given active compound until dripping wet.

After the specified period of time, the degree of destruction is determined percentagewise: 100% indicates that all of the aphids are killed, whereas 0% indicates that none of them is killed.

The active compounds, their concentrations, the evaluation time and the results obtained can be seen from the following Table 1:

TABLE 1
[Plant damaging insects]

| Active compound (constitution) | Concentration of active compound in percent | Degree of destruction after 24 hours in percent |
|---|---|---|
| (III) [structure: quinazoline-CO-N(CH$_3$)-CH-S-P(S)(OCH$_3$)$_2$] (According to invention, Example 5(b)) | 0.1 | 95 |
| (A) [structure: quinazoline-CO-N-CH$_2$-S-P(S)(OCH$_3$)$_2$] (Known from German Patent No. 927,270, Example 1) | 0.1 | 0 |
| (IV) [structure: quinazoline-CO-N(CH$_3$)-CH-S-P(S)(OC$_2$H$_5$)$_2$] (According to invention, Example 6) | 0.1 / 0.01 | 100 / 8 |
| (B) [structure: quinazoline-CO-N-CH$_2$-S-P(S)(OC$_2$H$_5$)$_2$] (Known from German Patent No. 927,270, Example 2) | 0.1 / 0.01 | 90 / 0 |
| (V) [structure: quinazoline-CO-N(CH$_3$)-CH-S-P(S)(C$_2$H$_5$)(OC$_2$H$_5$)] (According to invention, Example 8) | 0.01 / 0.001 | 100 / 40 |
| (C) [structure: quinazoline-CO-N-CH$_2$-S-P(S)(C$_2$H$_5$)(OC$_2$H$_5$)] (Known from German published Specification No. 1,083,827, Example 2) | 0.01 / 0.001 | 100 / 0 |

Example 2.—Tetranychus test

Solvent: 3 parts by weight acetone. Emulsifier: 1 part by weight alkylaryl polyglycol ether.

To produce a suitable preparation of the particular active compound, 1 part by weight of such active compound is mixed with the stated amount of solvent containing the stated amount of emulsifier, and the concentrate thereby formed is diluted with water to the desired final concentration.

Bean plants (*Phaseolus vulgaris*), which have a height of approximately 10–30 cm., are sprayed with the stated preparation of the given active compound until dripping wet. The bean plants are heavily infested with common spider mites (*Tetranychus urticae*) in all stages of development (strains resistant to phosphoric acid esters).

After the specified period of time, the effectiveness of the preparation of the particular active compound is determined by counting the dead mites. The degree of destruction thus obtained is expressed percentagewise: 100% indicates that all of the spider mites are killed, whereas 0% indicates that none of them is killed.

The active compounds, their concentrations, the evaluation time and the results obtained can be seen from the following Table 2:

TABLE 2
[Plant damaging mites]

| Active compound (constitution) | Concentration of active compound in percent | Degree of destruction after 48 hours in percent |
|---|---|---|
| (IV') [structure: quinazoline-CO-N(CH$_3$)-CH-S-P(S)(OC$_2$H$_5$)$_2$] (According to invention, Example 6) | 0.1 | 100 |
| (V') [structure: quinazoline-CO-N(CH$_3$)-CH-S-P(S)(C$_2$H$_5$)(OC$_2$H$_5$)] (According to invention, Example 8) | 0.01 | 100 |

Example 3.—Plutella test

Solvent: 3 parts by weight acetone. Emulsifier: 1 part by weight alkylaryl polyglycol ether.

To produce a suitable preparation of the particular active compound, 1 part by weight of such active compound is mixed with the stated amount of solvent containing the stated amount of emulsifier, and the concentrate thereby formed is dilute with water to the desired final concentration.

Cabbage leaves (*Brassica oleracea*) are sprayed with the preparation of the given active compound until dew moist and infested with the caterpillars of the diamondback moth (*Plutella maculipennis*).

After the specified period of time, the degree of destruction is determined percentagewise: 100% indicates that all of the caterpillars are killed, whereas 0% indicates that none of them is killed.

The active compounds, their concentrations, the evaluation time and the results obtained can be seen from the following Table 3:

TABLE 3
[Plant damaging insects]

| Active compound (constitution) | Concentration of active compound in percent | Degree of destruction after 4 days in percent |
|---|---|---|
| (III′) benzazimide-N–CH(CH$_3$)–S–P(S)(OCH$_3$)$_2$ (According to invention, Example 5(b)) | 0.1<br>0.01<br>0.001 | 100<br>100<br>95 |
| (A) benzazimide-N–CH$_2$–S–P(S)(OCH$_3$)$_2$ (Known from German Patent No. 927,270, Example 1) | 0.1<br>0.01<br>0.001 | 100<br>0<br>0 |
| (IV″) benzazimide-N–CH(CH$_3$)–S–P(S)(OC$_2$H$_5$)$_2$ (According to invention, Example 6) | 0.1<br>0.01<br>0.001 | 100<br>100<br>85 |
| (B) benzazimide-N–CH$_2$–S–P(S)(OC$_2$H$_5$)$_2$ (Known from German Patent No. 927,270, Example 2) | 0.1<br>0.01<br>0.001 | 100<br>0<br>0 |
| (V″) benzazimide-N–CH(CH$_3$)–S–P(S)(C$_2$H$_5$)(OC$_2$H$_5$) (According to invention, Example 8) | 0.1<br>0.01<br>0.001 | 100<br>100<br>20 |
| (C) benzazimide-N–CH$_2$–S–P(S)(C$_2$H$_5$)(OC$_2$H$_5$) (Known from German published Specification No. 1,083,827, Example 2) | 0.1<br>0.01<br>0.001 | 100<br>0<br>0 |

Example 4.—Boöphilus test

Solvent: 3 parts by weight acetone. Emulsifier: 1 part by weight alkylaryl polyglycol ether.

To produce a suitable preparation of the particular active compound, 1 part by weight of such active compound is mixed with the stated amount of solvent, the stated amount of emulsifier is added and the concentrate thereby formed is then diluted with water to the desired final concentration.

Ten female ticks (*Boöphilus microplus*) are placed on a small cotton pad which is subsequently immersed in the preparation of the given active compound. After one minute, the pad is removed from the solution and placed in a glass dish containing filter paper. The ticks are removed from the cotton pad and placed on dry filter paper.

After the specified period of time, the degree of destruction is determined percentagewise: 100% indicates that all of the ticks are killed, whereas 0% indicates that none of them is killed.

The active compounds, their concentrations and the results obtained can be seen from the following Table 4:

TABLE 4

| Active compound (constitution) | Concentration of active compound in percent | Degree of destruction after 72 hours in percent |
|---|---|---|
| (III″) benzazimide-N–CH(CH$_3$)–S–P(S)(OCH$_3$)$_2$ (According to invention, Example 5(b)) | 0.01<br>0.001 | 100<br>90 |
| (A) benzazimide-N–CH$_2$–S–P(S)(OCH$_3$)$_2$ (Known from German Patent No. 927,270, Example 1) | 0.01<br>0.001 | 70<br>0 |
| (IV‴) benzazimide-N–CH(CH$_3$)–S–P(S)(OC$_2$H$_5$)$_2$ (According to invention, Example 6) | 0.01<br>0.001 | 100<br>95 |
| (V‴) benzazimide-N–CH(CH$_3$)–S–P(S)(C$_2$H$_5$)(OC$_2$H$_5$) (According to invention, Example 8) | 0<br>0.0005<br>0.00025 | 0<br>100<br>40 |
| (C) benzazimide-N–CH$_2$–S–P(S)(C$_2$H$_5$)$_2$ (Known from German published Specification No. 1,083,827, Example 2) | 0.1 | 0 |

The following examples are given for the purpose of illustrating, without limiting, the production process in accordance with the present invention:

Example 5

(a) benzazimide-N–CH(CH$_3$)–Cl (IIb′)

150 grams (1 mol) of benzazimide are suspended in 750 cc. of chloroform. 117 grams (2.66 mol) of acetaldehyde are introduced into the resulting suspension, which is subsequently treated dropwise with 5 cc. of dimethyl formamide. 156 grams (1.3 mol-95 cc.) of thionyl chloride are then added dropwise to the reaction mixture in the course of 30 minutes. The temperature of the mixture thereby increases to 36° C. When the benzazimide is completely dissolved, the solution is poured into water which is changed several times and the phases are finally separated in a separating funnel. The organic layer is almost completely neutralized (tested by reaction to Congo Red paper) upon washing it with water. After drying the solution over anhydrous sodium sulfate, the solvent is distilled off. The residue, after distillation, solidifies in crystalline form and is recrystallized from 20 times the amount of ligroin. N-α-chloroethyl-(2)-benzazimide is obtained in the form of colorless, felted needles of melting point 103° C. The yield is 61 g. (29% of theory).

*Analysis.*—Calculated for $C_9H_8ON_3Cl$ (molecular weight 209.7): N, 20.04%; Cl, 16.15%. Found: N, 19.93%; Cl, 16.87%.

(b)

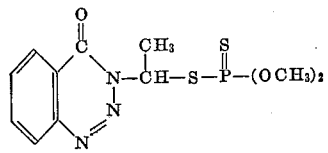

(III'''')

105 grams (0.5 mol) of N-α-chloroethyl-(2)-benzazimide, prepared according to Example 5(a), and 105 g. (0.6 mol) of ammonium O,O-dimethyl-thionothiol-phosphate are heated in 400 cc. of n-propyl alcohol at 60° C. for one hour. After the mixture has cooled, the precipitated ammonium chloride thereby formed is filtered off with suction and the solvent is distilled off from the filtrate under reduced pressure. The remaining oil is poured into water, whereupon it slowly solidifies in crystalline form. The crystals are filtered off with suction and the crystallizate is squeezed on clay in order to remove any adherent oil. After recrystallization from 12 times the amount of a petroleum ether/ethyl acetate mixture (3:1), the above compound, O,O-dimethyl-S-1-[benzazimido-(2)] ethyl-1-thionothiol-phosphate, is obtained in the form of colorless, small needles of melting point 94° C. The yield is 139 g. (84.2% of theory).

*Analysis.*—Calculated for $C_{11}H_{14}O_3N_3S_2P$ (molecular weight 331.4): N, 12.68%; S, 19.35%; P, 9.34%. Found: N, 12.64%; S, 19.34%; P, 9.21%.

Example 6

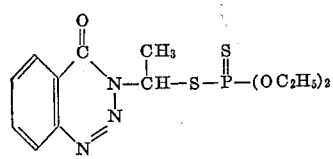

(IV'''')

105 grams (0.5 mol) of N-α-chloroethyl-(2)-benzazimide, prepared according to Example 5(a), and 121 g. (0.6 mol) of ammonium O,O-diethyl-thionothiol-phosphate are first stirred in 400 cc. of n-propyl alcohol at 30° C. When the weakly exothermic reaction has subsided, the mixture is subsequently further heated at 60° C. for one hour and the precipitated ammonium chloride thereby formed is filtered off with suction after the reaction mixture has cooled. The solvent is distilled off from the filtrate under reduced pressure and the residue, after distillation, is poured into water, whereupon it slowly solidifies in crystalline form. The crystallizate is filtered off with suction and air-dried. After recrystallization from 25 times the amount of petroleum ether, the ester of the above formula, O,O-diethyl-S-1-[benzazimido-(2)] ethyl-1-thionothiol-phosphate, is obtained in the form of colorless coarse crystals of melting point 56° C. The yield is 138 g. (77% of theory).

*Analysis.*—Calculated for $C_{13}H_{18}O_3N_3S_2P$ (molecular weight 359.4): N, 11.69%; S, 17.85%; P, 8.62%. Found: N, 11.88%; S, 17.85%; P, 8.89%.

Example 7

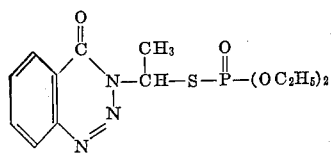

(VI)

105 grams (0.5 mol) of N-α-chloroethyl-(2)-benzazimide and 112 g. of (0.6 mol) ammonium O,O-diethylthiol-phosphate are heated in 400 cc. of n-propyl alcohol at 60° C. for one hour, while stirring. The precipitated ammonium chloride thereby formed is filtered off with suction, after the mixture has cooled. The solvent is distilled off from the filtrate under reduced pressure, and the remaining oil is taken up with benzene. The benzene solution is washed with a sodium bicarbonate solution and water, and dried over anhydrous sodium sulfate. After distilling off the benzene, 148 g. (78.2% of theory) of the compound of the above formula, O,O-diethyl-S-1-[benzazimido-(2)]ethyl-1-thiolphosphate, remain in the form of an orange-colored, very viscous oil.

*Analysis.*—Calculated for $C_{13}H_{18}O_4N_3SP$ (molecular weight 343.3): N, 12.27%; S, 9.34%; P, 9.02%. Found: N, 12.55%; S, 8.92%; P, 8.79%.

Example 8

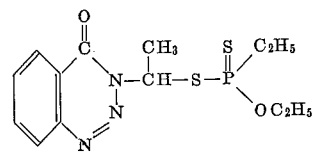

(V'''')

105 grams (0.5 mol) of N-α-chloroethyl-(2)-benzazimide and 124 g. (0.6 mol) of potassium ethyl-O-ethyl-thionothiolphosphonate are heated in 400 cc. of n-propanol for one hour, while stirring, and the precipitated potassium chloride thereby formed is filtered off with suction, after the mixture has cooled. The solvent is removed from the filtrate, the remaining oil is taken up with benzene and the reaction mixture worked up in the manner described in Example 7. The compound of the above formula, ethyl-O-ethyl-S-1-[benzazimido-(2)] ethyl - 1-thionothiol phosphonate, is obtained in the form of a viscous, orange-colored oil which slowly crystallizes. The yield is 146 g. (85.3%).

*Analysis.*—Calculated for $C_{13}H_{18}O_2N_3S_2P$ (molecular weight 343.4): N, 12.24%; S, 18.68%; P, 9.02%. Found: N, 12.69%; S, 18.78%; P, 8.84%.

Example 9

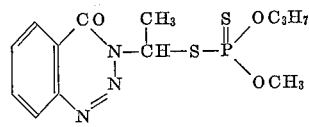

(VII)

105 grams (0.5 mol) of N-α-chloroethyl-(2)-benzazimide and 125 g. (0.6 mol) of sodium O-methyl-O-isopropyl-thionothiol-phosphate are heated in 400 cc. of n-propanol at 60° C. for one hour. After the mixture has cooled, the precipitated sodium chloride thereby formed is filtered off with suction, the reaction mixture is worked up in the manner described in Example 8 and 141 g. (78.6% of theory) of the above ester, O-methyl-O-isopropyl-S-1-[benzazimido-(2)] ethyl-1-thionothiol phosphate, are obtained in the form of an oil which slowly crystallizes. The crystals melt at 70 to 71° C.

*Analysis.*—Calculated for $C_{13}H_{18}O_3N_3S_2P$ (molecular weight 359.4): N, 11.69%; S, 17.84%; P, 8.61%. Found: N, 11.71%; S, 17.93%; P, 8.59%.

Example 10

In the same manner, using corresponding molar amounts of the following starting materials:
(a) N-α-bromoethyl - (2) - benzazimide and potassium methyl-O-sec.-butyl-thiol-phosphonate;
(b) N-α-fluoroethyl - (2)-benzazimide and sodium isopropyl-O-tert.-butyl-thionothiol-phosphonate;
(c) N-α-iodo-ethyl-(2)-benzazimide and ammonium n-butyl-O-sec.-butyl-thiol-phosphonate;
(d) N-α-chloroethyl - (2)-benzazimide and potassium O,O-di-tert.-butyl-thionothiol-phosphate;

(e) N-α-bromoethyl-(2)-benzazimide and sodium phenyl-O-n-propyl-thiol-phosphonate;

the particular thiol- and thionothiol-phosphoric and-phosphonic esters, respectively, are formed:

(a′) methyl-O-sec.-butyl-S-1-[benzazimido-(2)] ethyl-1-thiol-phosphonate;

(b′) isopropyl-O-tert.-butyl-S-1-[benzazimido-(2)] ethyl-1-thiol-phosphonate;

(c′) n-butyl-O-sec.-butyl-S-1-[benzazimido-(2)] ethyl-1-thiol-phosphate;

(d′) O,O-di-tert.-butyl - S-1-[benzazimido - (2)]ethyl-1-thionothiol-phosphate;

(e′) phenyl-O-n-propyl-S-1-[benzazimido - (2)] ethyl-1-thiol-phosphonate.

It will be appreciated, in accordance with the present invention, that in the foregoing formula:

R represents lower alkyl, such as methyl, ethyl, n-propyl, isopropyl, n-butyl, isobutyl, sec.-butyl, tert.-butyl, and the like, and particularly alkyl having 1 to 4 carbon atoms; lower alkoxy, such as methoxy, ethoxy, n-propoxy, isopropoxy, n-butoxy, isobutoxy, sec.-butoxy, tert.-butoxy, and the like, and particularly alkoxy having 1 to 4 carbon atoms; or phenyl;

R′ represents lower alkyl, including the same aforementioned alkyl radicals under R (i.e., methyl to tert.-butyl, inclusive), and the like, and particularly alkyl having 1 to 4 carbon atoms;

X represents oxygen or sulfur, preferably sulfur;

M represents a monovalent metal equivalent ion, such as sodium, potassium, lithium, and particularly an alkali metal ion, or ammonium ion; and Hal represents halogen, such as chloro, bromo, fluoro and iodo, and particularly chloro.

In accordance with a preferred feature of the invention, R may be methyl, ethyl, n-propyl, n-butyl, isobutyl, sec.-butyl, methoxy, ethoxy, n-propoxy, isopropoxy, and the like; and R′ may be methyl, ethyl, n-propyl, n-butyl, isobutyl, sec.-butyl, and the like as well, with X being sulfur, M being a sodium, potassium or ammonium ion, and Hal being a chlorine atom.

All of the foregoing compounds contemplated by the present invention possess the desired pesticidal, and especially insecticidal and acaricidal, activity, whereby combating of pests, such as arthropods, may be attained effectively.

It will be appreciated that as contemplated herein, the terms "arthropod," "arthropodicidal," and "arthropodicide" may be defined as encompassing specifically both insects and acarids within the contemplation of their meaning, for convenience in determining the collective aspects of utility herein. Thus, the insects and acarids may be considered herein collectively as arthropods to be combated collectively in accordance with the invention, and accordingly the insecticidal and/or acaricidal activity may be termed arthropodicidal activity, and the concomitant combative or effective amount used in accordance with the invention will be an arthropodicidally effective amount which in essence means an insecticidally or acaricidally effective amount of the active compound for the desired purpose.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Thiol- and thionothiol- -phosphoric and -phosphonic acid ester having the formula

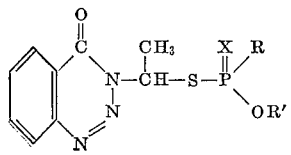

in which R is a member selected from the group consisting of lower alkyl, lower alkoxy, and phenyl, R′ is lower alkyl, and X is a member selected from the group consisting of oxygen and sulfur.

2. Ester according to claim 1 wherein R is selected from the group consisting of lower alkyl having 1 to 4 carbon atoms, and lower alkoxy having 1 to 4 carbon atoms, and X is sulfur.

3. Ester according to claim 1 wherein such compound is O,O-dimethyl - S - 1 - [benzazimido - (2)] ethyl-1-thionothiol-phosphate having the formula

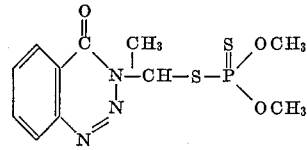

4. Ester according to claim 1 wherein such compound is O,O-diethyl - S - 1 - [benzazimido - (2)] ethyl-1-thionothiol-phosphate having the formula

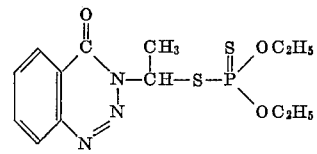

5. Ester according to claim 1 wherein such compound is ethyl - O - ethyl-S-1-[benzazimido-(2)-] ethyl-1-thionothiol phosphonate having the formula

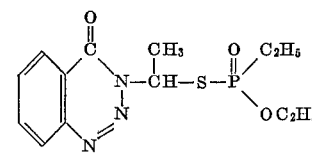

6. Ester according to claim 1 wherein such compound is O,O - diethyl-S-1-[benzazimido-(2)] ethyl-1-thiolphosphate having the formula

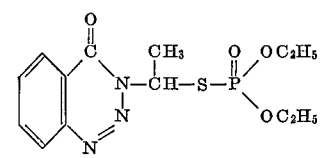

7. Ester according to claim 1 wherein such compound is O - methyl-O-isopropyl-S-1-[benzazimido-(2)] ethyl-1-thionothiol phosphate having the formula

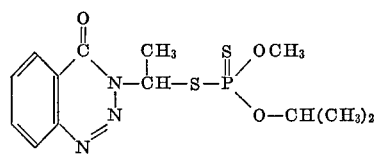

References Cited

UNITED STATES PATENTS

| | | | |
|---|---|---|---|
| 2,843,588 | 7/1958 | Lorenz | 260—248 |
| 3,165,513 | 1/1965 | D'Alelio | 260—248 |
| 3,202,658 | 8/1965 | Lorenz et al. | 260—248 |
| 3,294,631 | 12/1965 | Lorenz et al. | 167—33 |
| 3,309,371 | 3/1967 | Curry et al. | 260—248 |
| 3,325,492 | 6/1967 | Schrader et al. | 260—248 |

HENRY R. JILES, *Primary Examiner.*

J. M. FORD, *Assistant Examiner.*

U.S. Cl. X.R.

424—200

UNITED STATES PATENT OFFICE
CERTIFICATE OF CORRECTION

Patent No. 3,420,829                      January 7, 1969

Walter Lorenz

It is certified that error appears in the above identified patent and that said Letters Patent are hereby corrected as shown below:

Column 6, line 4, TABLE I, (IV), in the right-hand column under the heading "Degree of Destruction after 24 hours in percent", "8" should read -- 85 --. Column 12, line 65, "3,165,513" should read -- 3,165,515 --.

Signed and sealed this 31st day of March 1970.

(SEAL)
Attest:

Edward M. Fletcher, Jr.                   WILLIAM E. SCHUYLER, JR.
Attesting Officer                           Commissioner of Patents